(12) United States Patent
West (10) Patent No.: US 11,769,205 B2
(45) Date of Patent: *Sep. 26, 2023

(54) SYSTEM AND METHOD FOR CONTROLLED MARKET DATA DELIVERY IN AN ELECTRONIC TRADING ENVIRONMENT

(71) Applicant: TRADING TECHNOLOGIES INTERNATIONAL, INC., Chicago, IL (US)

(72) Inventor: Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,083

(22) Filed: Dec. 23, 2022

(65) Prior Publication Data

US 2023/0127042 A1 Apr. 27, 2023

Related U.S. Application Data

(63) Continuation of application No. 17/124,136, filed on Dec. 16, 2020, now Pat. No. 11,568,487, which is a continuation of application No. 16/733,804, filed on Jan. 3, 2020, now Pat. No. 10,937,095, which is a continuation of application No. 16/007,480, filed on
(Continued)

(51) Int. Cl.
*G06Q 40/04* (2012.01)
(52) U.S. Cl.
CPC ..................................... *G06Q 40/04* (2013.01)

(58) Field of Classification Search
CPC ...... G06Q 40/04; H04L 41/22; H04L 41/0213
See application file for complete search history.

(56) References Cited

U.S. PATENT DOCUMENTS 4,903,201 A 2/1990 Wagner
5,297,032 A * 3/1994 Trojan .................... G06Q 40/04
705/37

(Continued)

FOREIGN PATENT DOCUMENTS

AU 2007340076 12/2007
WO 02/09454 A2 1/2002
WO 2006/012284 A2 2/2006

OTHER PUBLICATIONS

Canadian Application No. 2,671,394, Office Action dated Nov. 29, 2011 (4 pages).
(Continued)

*Primary Examiner* — Asha Puttaiah
(74) *Attorney, Agent, or Firm* — McDonnell Boehnen Hulbert & Berghoff LLP (57) ABSTRACT

A system and methods for controlled market data delivery are described. According to one example embodiment, upon detecting a preset threshold of updates in a queue at a gateway, a predetermined number of market updates may be processed before any data is sent to a client terminal. According to one method, update types may be used to control how many updates are processed before any data is sent. Also, once the number of updates to be processed is set, a market update having a higher priority update type may be used to trigger a change in the number of market updates that was set for processing.

16 Claims, 8 Drawing Sheets

Related U.S. Application Data

Jun. 13, 2018, now Pat. No. 10,572,941, which is a continuation of application No. 11/617,839, filed on Dec. 29, 2006, now Pat. No. 10,026,122.

(56) References Cited

U.S. PATENT DOCUMENTS

| | | | |
|---|---|---|---|
| 6,026,406 A * | 2/2000 | Huang | G06F 16/2246 |
| 6,501,950 B1 | 12/2002 | Smith et al. | |
| 6,772,132 B1 | 8/2004 | Kemp, II et al. | |
| 6,938,011 B1 | 8/2005 | Kemp, II et al. | |
| 7,127,424 B2 | 10/2006 | Kemp, II et al. | |
| 7,228,289 B2 | 6/2007 | Brumfield et al. | |
| 7,389,268 B1 | 6/2008 | Kemp, II et al. | |
| 7,685,052 B2 | 3/2010 | Waelbroeck et al. | |
| 10,026,122 B2 | 7/2018 | West | |
| 10,572,941 B2 | 2/2020 | West | |
| 2003/0009553 A1 | 1/2003 | Benfield et al. | |
| 2003/0055768 A1 | 3/2003 | Anaya et al. | |
| 2003/0061069 A1 | 3/2003 | Silverman et al. | |
| 2004/0019554 A1 * | 1/2004 | Merold | G06Q 40/04 705/37 |
| 2004/0254877 A1 | 12/2004 | Buckwalter et al. | |
| 2005/0177657 A1 | 8/2005 | Pope et al. | |
| 2005/0198437 A1 | 9/2005 | Mukherjee | |
| 2006/0287934 A1 | 12/2006 | Rowe, III | |
| 2007/0100733 A1 | 5/2007 | Huizing et al. | |
| 2008/0097887 A1 | 4/2008 | Duquette et al. | |
| 2008/0097893 A1 | 4/2008 | Walsky et al. | |
| 2008/0162324 A1 | 7/2008 | West | |
| 2018/0293652 A1 | 10/2018 | West | |
| 2020/0143472 A1 | 5/2020 | West | |

OTHER PUBLICATIONS

European Application No. 07855266.8, Extended Search Report dated Dec. 2, 2010 (7 pages).

European Application No. 07855266.8, Office Action dated Nov. 17, 2011 (4 pages).

European Application No. 07855266.8, Official Communication dated Apr. 20, 2012 (3 pages).

International Search Report and Written Opinion of International Application No. PCT/US2007/088143 dated Mar. 1, 2008 (dated Apr. 28, 2008) (10 pages).

Preliminary Examination Instructions in view of the Supreme Court Decision in *Alice Corporation Pty. Ltd.* v. *CLS Bank International, et al.* (signed Jun. 25, 2014).

Sable, et al., "Evolution to the Advanced Intelligent Network," *Evolution to the Advanced Intelligent Networks*, AT&T, Apr. 5, 1992, pp. 103-113 (Document No. XP000684008).

Singapore Application No. 2009-04177-3, Written Opinion issued by Austrian Patent Office (dated Nov. 16, 2009) (4 pages).

Singapore Application No. 2009-04177-3, Examination Report issued by Austrian Patent Office (dated Oct. 13, 2010) (4 pages).

* cited by examiner

SYSTEM AND METHOD FOR CONTROLLED MARKET DATA DELIVERY IN AN ELECTRONIC TRADING ENVIRONMENT

CROSS REFERENCE TO RELATED APPLICATIONS

This application is a continuation of U.S. patent application Ser. No. 17/124,136 filed Dec. 16, 2020, now U.S. Pat. No. 11,568,487, which is a continuation of U.S. patent application Ser. No. 16/733,804, filed Jan. 3, 2020, now U.S. Pat. No. 10,937,095, which is a continuation of U.S. patent application Ser. No. 16/007,480, filed Jun. 13, 2018, now U.S. Pat. No. 10,572,941, which is a continuation of U.S. patent application Ser. No. 11/617,839, filed Dec. 29, 2006, now U.S. Pat. No. 10,026,122, entitled "System and Method for Controlled Market Data Delivery in an Electronic Trading Environment," the contents of each of which are fully incorporated herein by reference for all purposes.

TECHNICAL FIELD

The present invention is directed towards electronic trading. More specifically, the present invention is directed to tools for controlled data delivery in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Subscribing traders are connected to an exchange's electronic trading platform by way of a communication link and through an application program interface to facilitate real-time electronic messaging between themselves and the exchanges. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the types of market information published by an electronic exchange often differ from market to market, there are generally some standard pieces of information. Market information may include data that represents just the inside market. The inside market is the lowest available ask price (best ask) and the highest available bid price (best bid) in the market for a particular tradeable object at a particular point in time. Market information may also include market depth. Market depth refers to quantities available at the inside market and may also refer to quantities available at other prices away from the inside market. The quantity available at a given price level is usually provided by the exchange in aggregate sums. In other words, an exchange usually provides the total buy quantity and the total sell quantity available in the market at a particular price level in its data feed. In addition to providing order book information, such as price and quantity information, electronic exchanges can offer other types of market information such as the open price, settlement price, net change, volume, last traded price, the last traded quantity, and order fill information.

The extent of market depth available for a trader usually depends on the exchange. For instance, some exchanges provide market depth for all (or most) price levels, and others may provide no market depth at all. Electronic exchanges may also limit the market depth offered as market information can become intensive for network and client devices to process. For instance, an electronic market might offer only five levels of market depth, which includes the quantities available at the current top five buy prices and the quantities available at the current top five sell prices.

Regardless of the extent of data provided by an exchange, the intermediary devices, such as gateways, may become unable to handle the massive processing load and, at least during those times, they cannot maintain near real-time processing. The processing requirements may further increase when a gateway receives data feeds for multiple tradeable objects or at times of high market activity when a gateway is bombarded with a large number of messages for even a single tradeable object. As more traders begin trading in the electronic trading environment, the load on the intermediary devices is expected to increase even further.

Electronic exchanges and/or distributors of market information often struggle to balance the message processing load and the timeliness of market information messages to deliver fast response market data feeds. Most often, traders want access to as much of the information as fast as possible so that they can make more efficient and more effective trades. One example system that assists in processing data at intermediary devices has been described in the commonly assigned patent application Ser. No. 11/551,567, entitled "System and Method for Prioritized Data Delivery in an Electronic Trading Environment," filed on Oct. 20, 2006, now U.S. Pat. No. 7,747,513. According to one example embodiment in that system, different types of information in a data feed can be associated with different priority levels, and market data associated with a lower priority level can be temporarily stored in a queue, while market data with a higher priority level is sent to a client device.

BRIEF DESCRIPTION OF THE DRAWINGS

Example embodiments are described herein with reference to the following drawings, in which.

SUMMARY

Systems that assign priority levels to different market data types and either send or temporarily store market updates based on the assigned priority levels, such as the one described in the commonly assigned patent application Ser. No. 11/551,567, now U.S. Pat. No. 7,747,513, entitled "System and Method for Prioritized Data Delivery in an Electronic Trading Environment," may be beneficial in certain environments. However, such systems may result in delays and bottleneck at times of high market activity when many high priority messages are received at an intermediary device. Thus, it would be beneficial to provide another system that would deliver market data with fewer delay limitations.

According to one example embodiment described herein, an example method for controlled market data delivery is provided. According to one example method, a plurality of market updates is received at a network device from an electronic exchange that includes a computerized matching engine for automatically matching electronic bids and offers received from a plurality of trading stations for a tradeable object. The received market updates include market information related to the tradeable object such as an inside market related data, a trade related data, or market depth data. When the plurality of market updates are received at the intermediary device, they may be placed in a queue and processed based on the number of each update in the queue. According to one example method, when the first update in the plurality of updates is processed, an update type is determined based on the type of market information in the first update. Upon determining the update type of the first update, a first number of market updates is dynamically set for processing in the queue before any market updates are sent from the network device to the receiving trading stations. As the first number of market updates are processed, market data in the processed updates is coalesced so that the most up to date information is provided to the trading stations. Upon processing the first number of updates, the coalesced data may be sent to the client terminals. As will be described in greater detail below, the first number of updates preset for processing can be dynamically modified based on another update type, such as an update comprising higher priority data, that is detected within the first set of updates that are processed. According to one example embodiment, the higher priority update type can either increase or decrease the number of updates that are processed before any coalesced data is sent to the client terminals.

DETAILED DESCRIPTION

I. A First Example Trading System

Figure 1:
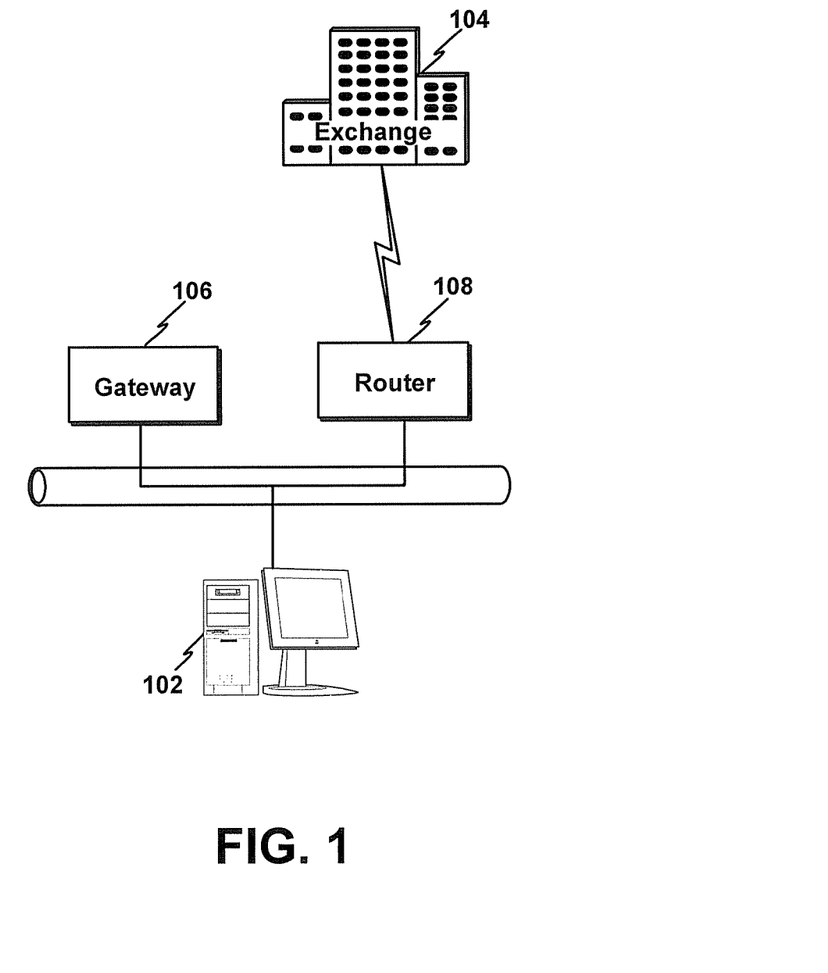
FIG. 1 illustrates an example electronic trading system in which the example embodiments may be employed in relation to a single exchange.

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing trading station 102. Market information may include data that represents just the inside market. The inside market is the lowest sell price (best ask) and the highest buy price (best bid) at a particular point in time. Market information may also include market depth. Additionally, the exchange 104 can offer other types of market information such as the last traded price (LTP), the last traded quantity (LTQ), and order fill information.

The computer employed as the trading station 102 generally can range from a hand-held device, laptop, or personal computer to a larger computer such as a workstation and multiprocessor. An illustrative personal computer may use PENTIUM® microprocessors and may operate under a WINDOWS® operating system, or yet may use some other microprocessor or operating system. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

In one example embodiment, the trading station 102 uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a trading station could run automated types of trading applications.

The example embodiment may be implemented in relation to any type of trading screen, therefore, details regarding the trading screen are not necessary to understand the present invention. However, in one embodiment, one type of trading screen that can be used is provided by a commercially available trading application referred to as X_TRADER☐ from Trading Technologies International, Inc. of Chicago, Ill. X_TRADER☐ also provides an electronic trading interface, referred to as MD Trader☐, in which working orders and/or bid and ask quantities are displayed in association with a static price axis or scale.

Portions of the X_TRADER☐ and the MD Trader®-style display are described in U.S. Pat. No. 6,772,132, entitled "Click Based Trading With Intuitive Grid Display of Market Depth," filed on Jun. 9, 2000, U.S. Pat. No. 6,938,011, entitled "Click Based Trading with Market Depth Display" filed on Jun. 9, 2000, U.S. Pat. No. 7,127,424 entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, which issued as U.S. Pat. No. 7,389,268 on Jun. 17, 2008; and U.S. patent application Ser. No. 10/376,417, entitled "A System and Method for Trading and Displaying Market Information in an Electronic Trading Environment," filed on Feb. 28, 2003, which issued as U.S. Pat. No. 7,228,289 on Jun. 5, 2007, the contents of each of which are incorporated herein by reference. However, it should be understood that orders in the system illustrated in FIGS. 1 and 2 could also be placed using any other trading application as well. Additionally, the preferred embodiments are not limited to any particular product that performs translation, storage, and display function.

The computer employed as the gateway 106 generally can range from a personal computer to a larger or faster computer. An illustrative gateway computer may use PENTIUM® microprocessors and may operate under a WINDOWS® (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

Memory on either the gateway 106 or the trading station 102 may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the trading station may communicate with the gateway over a wide area network or through the use of a T1, T3, ISDN, or some other high speed connection.

Further, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
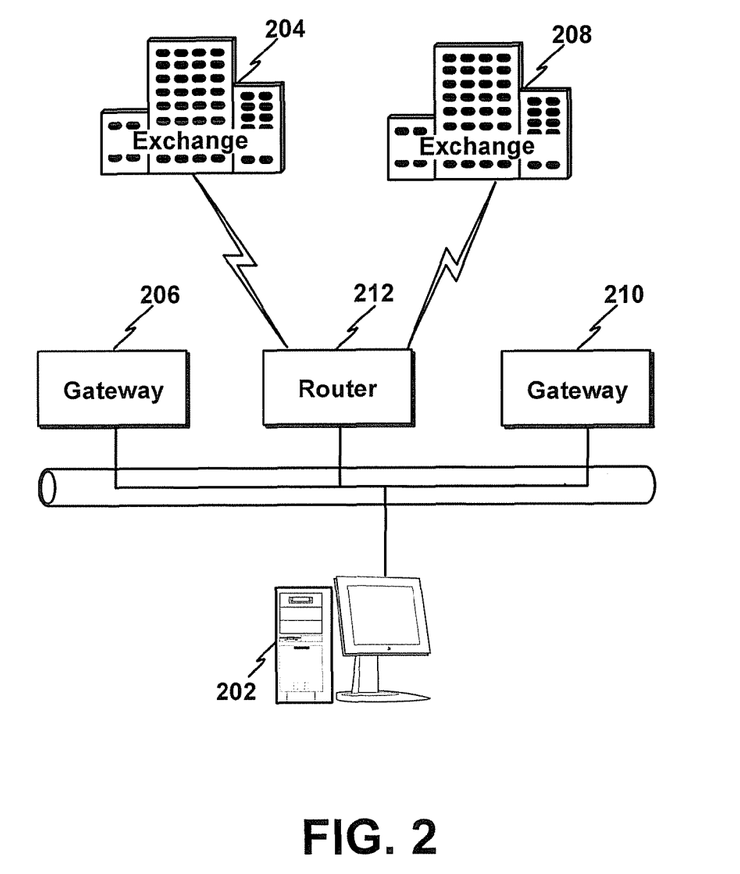
FIG. 2 illustrates another example trading system that uses similar computer elements as shown in FIG. 1, in which, the example embodiments may be employed in relation to multiple electronic exchanges.

FIG. 2 illustrates another example trading system that uses similar computer elements as shown in FIG. 1, in which a trader may access and trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread-trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

III. Controlled Market Data Delivery

As explained earlier, a gateway may include one more computers that process and send to client terminals market information that is received from an electronic exchange. A gateway may include one or more data queues that can be used to temporarily store market updates that are received from an electronic exchange. As the data is placed in the queue, the gateway may process each update one at a time in the order the updates were received at the gateway, and then may send each processed update to a client terminal. The processing of updates may involve changing the format of the updates to one that can be easily processed at client terminals to which the updates are sent. However, as more market updates are received at the gateway, delays may occur because the gateway may not be able to process and send market data as fast as the data is received at the gateway.

Additionally, many inbound markets are often merged into a single feed. In such an environment, when a block containing a plurality of updates is received at a gateway, the overall time it takes to send all updates in the received block to a client terminal may be much longer as compared to the time it took to receive all updates in the block. For example, if '10' updates are in the received block of updates, there is no way to push all updates to client terminals in the same time it took to receive the block of updates, as each update is separately sent to the client terminal. Also, while the time required to process each update is typically short, often on the order of microseconds, the delays in sending updates to client terminals are often due to hardware limitations, e.g., the time it takes to communicate with a network card that allows the processed updates to be sent to client terminals could be in the order of milliseconds. Thus, as will be explained in greater detail below, the example embodiments are directed to a system and methods for data delivery that focus on processing a predetermined set of market updates and coalescing the processed data before any updates are sent to a client terminal. Such a system is especially useful during periods of high market activity when the number of market updates placed in a queue at a gateway highly exceeds the processing capabilities of the gateway.

More specifically, the example methods allow a system administrator to define a number of market updates to be processed before any data is sent from a gateway to a client terminal during periods of high market activity. According to one embodiment that will be used in the examples below, the number of updates to be processed before any data is sent from a gateway to a client terminal could be set based on predefined trigger points, and the trigger points could be set to different types of market updates. As will be described in greater detail later, when one trigger point is in effect, other trigger points could overwrite it to effectively decrease the number of updates to be processed at a gateway before any data is sent to a client terminal. The trigger points could also take effect only at times of high market activity when the processing capacity of a gateway is exceeded by the number of updates that are received from an exchange. However, different configurations are possible as well.

The types of market updates to be used as trigger points may include a market depth update, an inside market related update, and a trade information update. A market depth update may include prices and quantities away from the inside market. An inside market related update may include inside market prices and/or a best bid/ask quantity at the inside market prices. A trade information update may include either a last traded quantity/price for a tradeable object or trade match information, such as private order related information that notifies a specific trader that a match has occurred for an order that was submitted to an electronic exchange. As used herein, a trade match occurs when an electronic trading system matches a trader willing to buy a defined quantity of a tradeable object at a defined price to another trader offering to sell the same tradeable object at the same or better price. When a trade match is detected at a gateway, a trade match message may be sent to a specific trader whose order got matched, and the trade match message may include an order number, an account number, transaction code, time, price, quantity, and a tradeable object for which the order was placed. While the described market update types will be used in relation to the examples below, it should be understood that the example embodiments are not limited to the defined update types and could be used in systems with more, fewer, or different update types.

Figure 3:
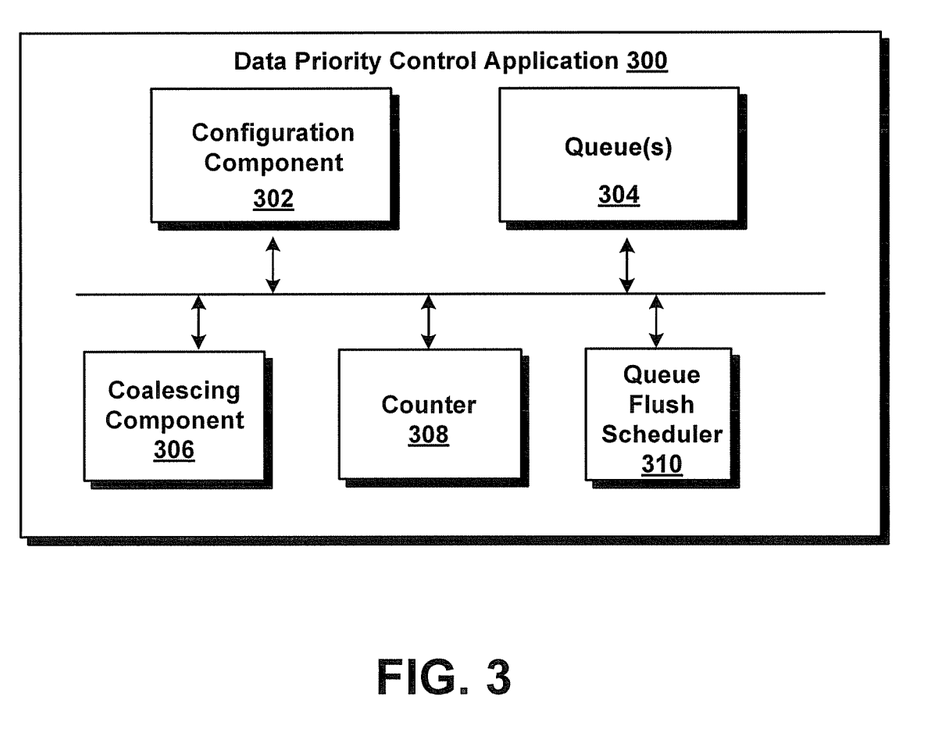
FIG. 3 is a block diagram illustrating a data priority control application that could be used at a gateway to provide prioritized type-based data delivery.

FIG. 3 is a block diagram illustrating a data priority control application 300 that could be used at a gateway to provide data delivery according to the example embodiments described herein. The data priority control application 300 includes a configuration component 302, one or more data queues 304, a coalescing component 306, a counter 308, and a queue flush scheduler 310, all of which may communicate with each other. The components 302, 304, 306, 308, and 310 may include software and/or hardware elements to perform their functions. However, it should be understood that the data priority control application 300 could include more or fewer components than those shown in FIG. 3. Also, the illustrated components could be combined with other components of a particular gateway.

The configuration component 302 provides configuration means that allow a system administrator to define desired trigger points and a number of data updates to be processed in relation to each trigger point before the processed updates are sent to a client terminal. Additionally, the configuration component 302 may allow a user to specify an activation parameter that could dynamically control when the example methods for controlled data delivery should be activated. As mentioned earlier, the trigger points could take effect only at times of high market activity when the number of updates that are stored in the data queue(s) 304 exceeds a predefined threshold related to the processing capacity of a gateway. According to one example embodiment, the activation parameter could be based on a number of updates currently pending in the data queue(s) 304 and waiting for processing. Alternatively, an average rate at which market updates are received at a gateway could also be used as the threshold.

It should be understood that the configuration component 302 could use an API (applications programming interface) to allow for configuration of the desired parameters by an administrator. The API could reside on a gateway that includes the data priority control application 300 or may be on a remotely located workstation or interface device, including a wired or wireless device.

According to the example embodiments for controlled market data delivery, as market updates are received at a gateway, they may be placed in the queue(s) 304. Then, the gateway may process the received market updates one by one in the order they were placed in the queue(s) 304. Rather than sending them to client terminals, the coalescing component 306 may in some circumstances, as described below, coalesce the updates so that when it is time to transmit data to the client terminal the most up to data information is sent. As defined herein, coalescing involves consolidating multiple market information updates with other market information updates to create a single update with the most recent information. For example, if there are two updates related to the inside market among the updates processed by the gateway, the coalescing component 306 could combine the two updates to reflect the most current market conditions before any inside market related update is sent to a client terminal. The coalescing of updates may involve comparing the two updates and then overwriting data that is no longer accurate in the first inside market related update with the data in the most recent update.

The counter 308 may be configured to count updates that are received at the gateway and/or monitor a rate at which the updates are stored in the queue(s) 304. Additionally, as the trigger points are activated, the queue flush scheduler 310 may schedule the next time for transmission of data from the gateway to the client terminal. As mentioned earlier, a trigger point may set a number of updates to be processed before any data is transmitted from the gateway. Additionally, the number of updates to be processed could dynamically change based on any newly detected trigger points. If the trigger points are based on market update types, as in the example embodiments below, the new trigger points may be detected as each market update is processed in the queue(s) 304. As the number of updates to be processed is set, the counter component 308 can monitor the count of the processed update, and when the preset count is reached, the coalesced data may be sent to one or more client terminals.

A. Method Overview

Figure 4A:
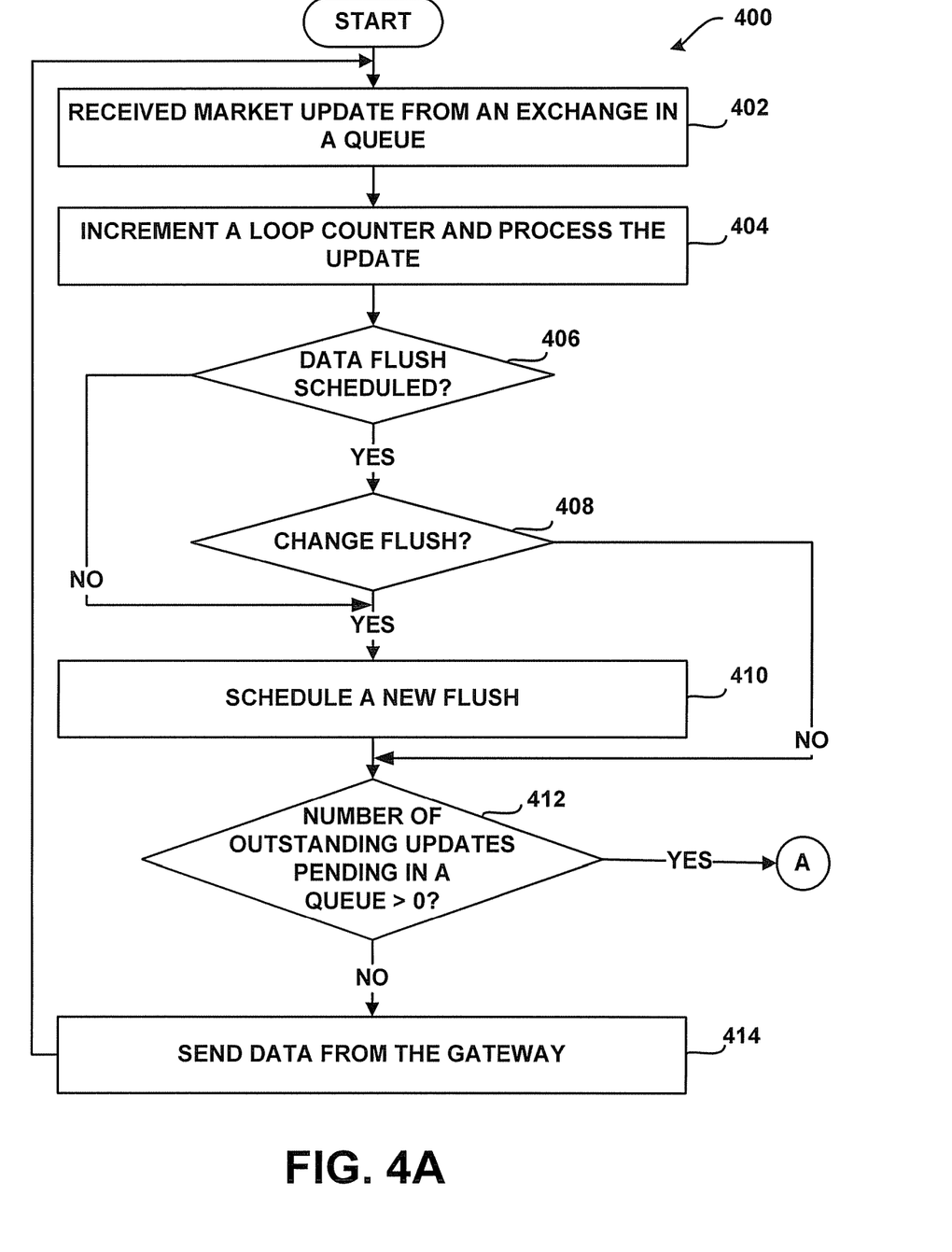
FIGS. 4A and 4B illustrate a flow diagram of a method for providing controlled market data delivery according to an example embodiment.
Figure 4B:
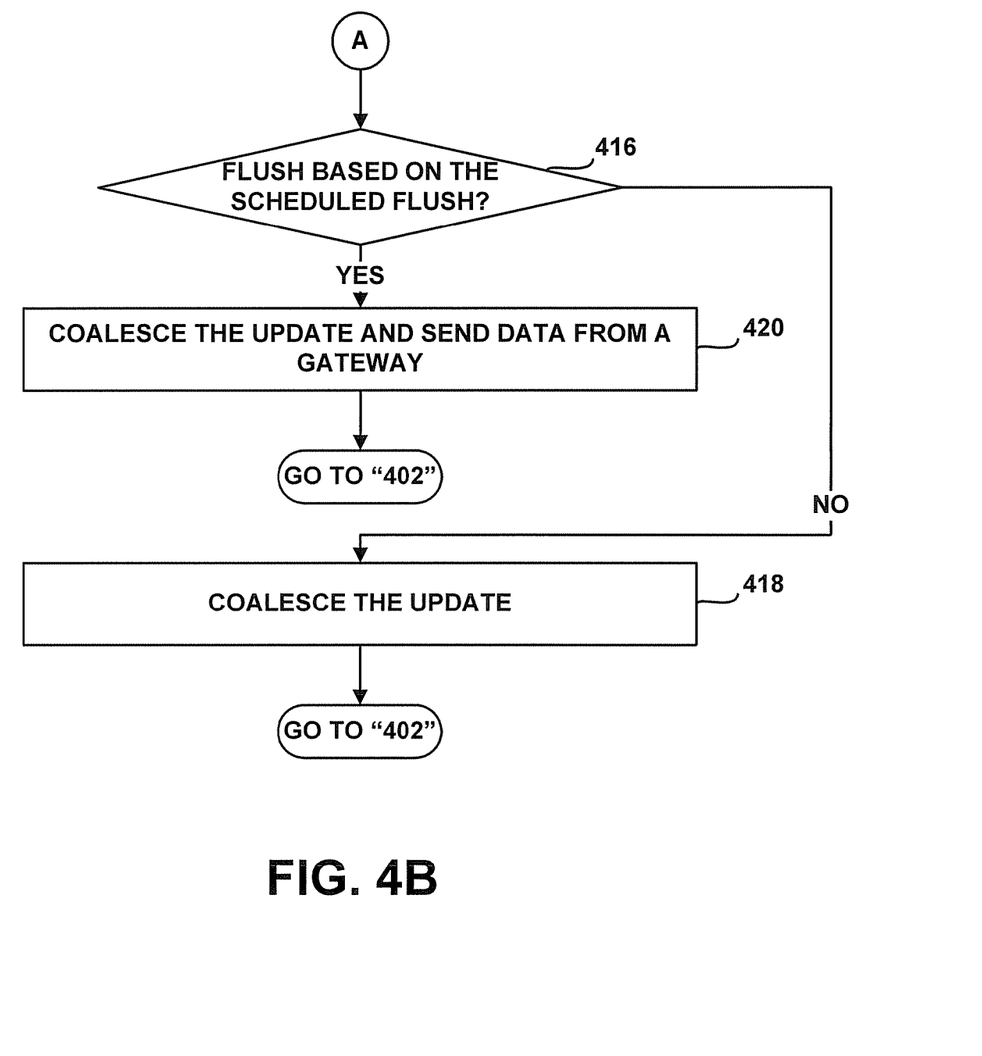

FIGS. 4A and 4B illustrate a flow diagram of a method 400 for providing controlled market data delivery according to one example embodiment. It should be understood that each block in this flow diagram may represent a module, segment, or portion of code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the present invention.

At step 402, one or more market updates are received from an electronic exchange and are placed in a queue at a gateway. At step 404, a loop counter in the queue is incremented and the update is processed. According to one example embodiment, a loop counter value may be assigned to the processed update, and the loop counters may be used as reference points for scheduling data transmission times for sending data from the gateway to a client terminal. In such an embodiment, when the scheduled loop counter value is reached, the processed data may be sent to the client terminal. As mentioned earlier, processing an update at the gateway may involve changing the format of the update to that being used at the client terminal. Additionally, the new update may be coalesced with other corresponding data, e.g., a new inside market update may be coalesced with a previously stored inside market update so that when it is time to sent the updates to the client terminal only the most recent data is sent.

At step 406, it is determined if a data flush has been scheduled based on the previously received data. According to one example embodiment, the scheduling may be based on trigger points, i.e., market update types that are received from an electronic exchange. The market update types may be prioritized based on the importance of each update type to a trader, and the market update types with the highest priority may be used to schedule the shortest counter intervals compared to those that are typically of the lesser importance to a trader. For example, when the example embodiments for prioritized data delivery are activated, a market update containing a depth update may trigger a queue flush to be scheduled after 20 consecutive update counts, or in other words, after 20 updates are processed. Then, an update with an inside market may be associated with 10 counts, and an update that includes trade related data may be set to 5 counts. As mentioned earlier, queue flushes could also be based on different types of information as well. If no queue flush has been scheduled, the method continues at step 410.

At step 408, if the queue flush has been already scheduled, it is determined if it should be modified based on the newest market update that was just processed. The scheduled data flush may be modified upon receiving an update with a higher priority level. For example, if the initial data flush was based on a depth update, and thus was set to 20 counts, and the next update that is processed is an inside market update, the scheduled flush may be modified to now correspond to 10 counts. According to one example embodiment, the received update may only reduce the count associated with the scheduled flush. For example, when the flush is scheduled based on an inside market update and then a market depth update is processed, the flush scheduled based on the inside market update will control. However, if a market update corresponding to trade data is processed once the flush is set based on the inside market update, the new flush set based on the trade update may control even if it means increasing the time period until the next flush. Such an embodiment may be especially useful when it is important to send as few packets as possible. Alternatively, in such an embodiment, if the flush set by the inside market update is to occur sooner than a flush to be set based on a later received trade related update, the flush scheduled based on the inside marker could control. Specific examples illustrating example embodiments for selecting the controlling flush will be described in greater detail below. If no change in the scheduled flush is required, the method 400 continues at 412.

If there is no flush scheduled, or the scheduled flush is to be changed, the new flush is scheduled, as shown at 410. As mentioned earlier, the flush may be scheduled by setting the update counter to a specific value. At step 412, it is determined if the number of outstanding updates pending in the queue in addition to the current update is greater than zero. While zero is used in this example embodiment, it should be understood that different values could also be used as well. According to one example embodiment, if there are outstanding updates in the queue, the scheduled flush is used to determine the next time when data corresponding to the pending updates will be sent from the gateway. As mentioned earlier, rather than checking the number of outstanding updates in the queue, a rate at which updates are received at a gateway may be measured, and the high update rate may also trigger the use of the flush counter. If the number of updates or the update rate is below a threshold, the gateway may process the updates in the normal manner, with data from each processed update getting independently sent to the client terminal, as shown at 414, and the method 400 continuing at 402.

In this example embodiment, referring back to 412, if the number of outstanding updates is greater than zero, at step 416, it is determined if the scheduled flush has been reached. If not, the market update may be coalesced or temporarily stored, as shown at 418, and the method continues at 402. If the loop counter associated with the update reaches the scheduled flush counter, at 420, the received market update may be coalesced with already stored updates, and data from one or more stored market updates may be sent from the gateway. According to one example embodiment, there could be two types of updates that are sent to the client terminal. The first update may include depth related data, and the second update may include inside market related information and trades that were received between the last flush and the current flush. It should be understood that since the coalescing is performed between each instance of sending the updates to the client terminal, the depth related update would include the most recent depth data, and the inside market related update would include the most recent best bid/ask prices and the most recent best bid/ask quantities. Additionally, in one example embodiment, the trades could be sent in the inside market update. However, it should be understood that a separate update including trade related data could be sent as well depending on the system configuration.

B. Data Processing Examples-Single Data Stream

Figure 5:
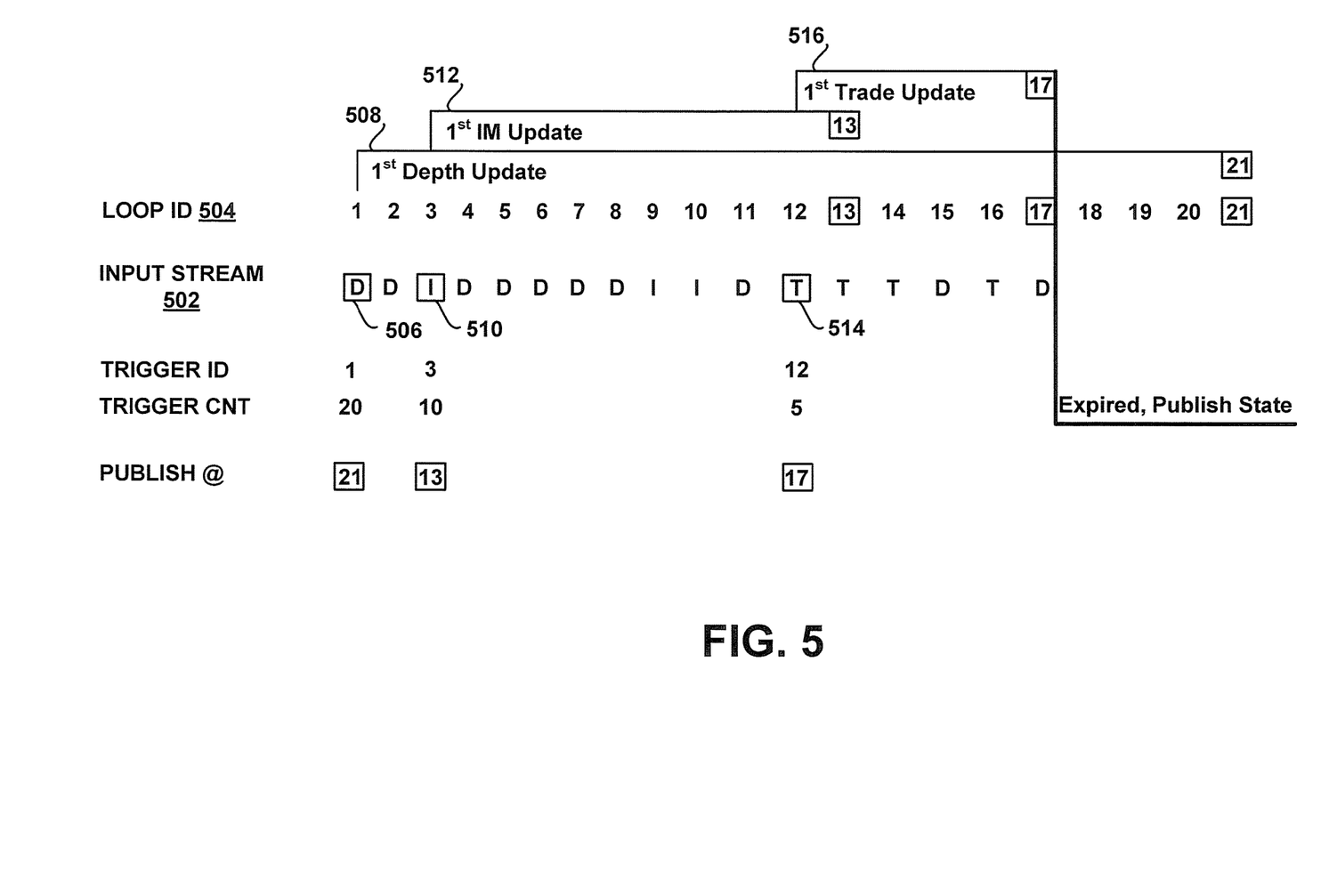
FIG. 5 is a block diagram illustrating an example operation of the system for controlled market data delivery for an input stream corresponding to a single tradeable object.

FIG. 5 is a block diagram 500 illustrating one example operation of the system for controlled market data delivery for an input stream corresponding to a single tradeable object. In this example, it will be assumed that a trade related update triggers the flush after 5 updates are processed, an inside market update triggers the flush after 10 updates are processed, and a depth related update triggers the flush after 20 updates. It should be understood that different values could also be used based on the system administrator's preferences. Additionally, it will be assumed that when the first update is to be processed in the queue, a predefined threshold, such as a predefined number of updates pending in the queue, is exceeded and the example method for controlled market data delivery is activated.

Referring now to FIG. 5, as each update is received from an input stream 502 and placed in a queue at a gateway, the update may be assigned a counter value, here a Loop ID 504. The assignment of the counter value can occur either at the time the update is placed in the queue or at the time when the update is processed. It is assumed that the updates shown in relation to the input stream 502 are the currently pending updates in a queue at a gateway. Also, it is assumed that the current number of updates exceeds the processing capacity of the gateway so that the example methods for prioritized data delivery are activated.

The first update to be processed from the input stream is a market depth update 506 that is assigned a Loop ID of 1. As the market depth update (TY) 506 matches one of the pre-defined triggers, a queue flush is scheduled. Since a market depth update triggers a flush after 20 updates, when the update 506 is processed, a queue flush is scheduled to occur at the Loop ID of 21, as shown at 508. Since the second update is yet another depth update, no change to the scheduled flush is made. As mentioned earlier, the scheduled flush may be modified when a higher priority update is detected once the flush is scheduled. A higher priority update compared to a market depth update, as defined in the examples provided herein, is either an inside market update or a trade related update. Thus, when an update (T) 510 that corresponds to an inside market is detected and processed, the counter for the queue flush is modified as shown at 512, and the new queue flush is scheduled to now occur after 10 updates, i.e., in this example, when the Loop ID reaches 13, as shown at 512. Finally, the next higher priority update occurs at the Loop ID of 12 when an update ('T') 514 containing trade data is processed. Since a trade related update is a higher priority update compared to an inside market update, the scheduled flush is once again modified to now occur 5 updates after the Loop ID of 12 corresponding to the trade update 514, i.e., at the Loop ID count of 17, as shown at 516.

In the embodiment shown in FIG. 5, the highest priority update controls the flush counter even if it means extending the time until the next flush occurs. Such an embodiment may be preferred by some system administrators as it lowers the number of packets that are sent out from a gateway, as more updates will be coalesced or yet combined into a single packet. Additionally, it may be preferred to send as many highest priority messages in the same packet as possible. Often, the high priority message may signal the start of a batch of other high priority messages. Thus, extending the flush, as the described herein may be beneficial and may result in fewer packets with more up to date data being sent to client devices.

However, different embodiments could be used as well. For example, the system could be programmed such that a higher priority update could only decrease the Loop ID of the scheduled flush. In such an embodiment, in the example provided in FIG. 5, the flush would occur at the Loop ID of 13, rather than extending the time until the next flush.

In a normal gateway configuration, it takes much less time to process each update as compared to sending data from a gateway due to hardware limitations, etc., as explained earlier. Thus, the first embodiment that involves processing more updates and creating fewer packets may be more beneficial and may result in more up to date data being received at a client terminal. As an example, assuming that it takes 10 microseconds to process each update and 1 millisecond to send data to a client terminal, in the embodiment shown in FIG. 5, it would take 1.17 milliseconds to process 17 updates and to send the data to a client terminal. More specifically, it would take 0.17 ms to process 17 updates, i.e., 17 updates times 0.01 ms (10 μs), and it would take an additional 1 ms to send the data, thus, resulting in the total time of 1.17 ms. Now, according to the second embodiment for setting a flush, assuming that a flush would occur at the Loop ID of 13, and the next update would result in the flush at the Loop ID of 19 as the trade update at 14 would set the flush to the Loop ID 19, it would take the system additional 1.05 milliseconds to send data corresponding to the total of 19 updates vs. 17 updates. Thus, as explained earlier and in relation to this specific example, it might be beneficial to extend the time until the next flush as in the first embodiment shown above.

C. Data Processing Examples-Multiple Data Streams

Figure 6:
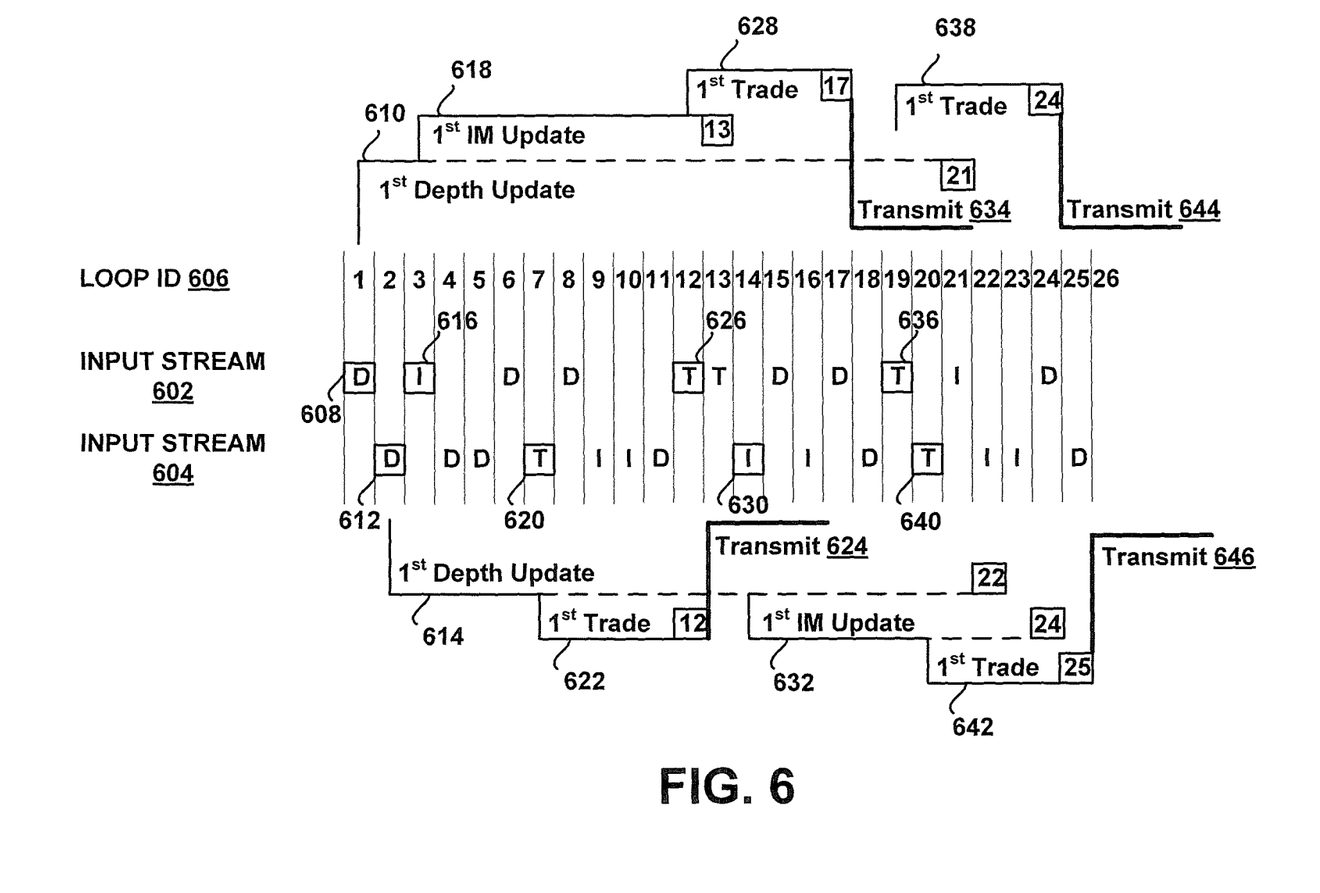
FIG. 6 is a block diagram illustrating an example operation of the system for controlled market data delivery when two input streams are received at a gateway.

While the example in FIG. 5 was described in relation to a single stream of data corresponding to a tradeable object, a typical gateway may receive updates for many more tradeable objects, often in the order of hundreds or thousands. FIG. 6 is a block diagram 600 illustrating one example operation of the system for a controlled market data delivery when two input streams are received at a gateway. It should be understood that the illustrated example could be easily extended to more than two input streams, and the example embodiments are not limited to any specific number of input streams.

Similarly to the example in FIG. 5, a trade related update in FIG. 6 will result in triggering a queue flush after the loop count of 5, an inside market related update will trigger a queue flush after the loop count of 10, and the market depth update will trigger a queue flush after the loop count of 20. It should be understood that different loop counts could also be used in relation to each update type. Also, while the same loop count will be used in relation to data corresponding to updates of both tradeable objects, it should be understood that different settings could be used for each tradeable object.

Referring to FIG. 6, there are shown two input streams, with the first input stream 602 corresponding to a first tradeable object, and the second input stream 604 corresponding to a second tradeable object. As updates corresponding to each tradeable object are received at a gateway, they are placed in a queue and as each of them gets processed, a Loop ID as shown at 606 is assigned to each update.

As shown in FIG. 6, the first update in the queue with the Loop ID of 1 is a market depth update 608 corresponding to the first tradeable object. As the market depth update 608 is one of the predefined triggers, a queue flush may be scheduled. Since a market depth update type is assigned to correspond to a count of 20, the update 608 triggers a queue flush to be scheduled at the Loop ID of 21, as shown at 610. The second update 612 in the queue is a market depth update corresponding to the second tradeable object. As both data streams are placed in the same data queue, the flush counter for each tradeable object may use the same series of Loop IDs to be used as reference points for the flushes. Thus, when the market depth update 612 for the second tradeable object is received, the flush for data corresponding to the second tradeable object may be scheduled at the Loop ID of 22, as shown at 614.

As the gateway continues processing updates in the queue, the third update with the Loop ID of 3 corresponds to an inside market update 616 for the first tradeable object. As the inside market update 616 is a higher priority update compared to the update 608, the scheduled flush for the first tradeable object is modified to now correspond to the Loop ID of 13, as shown at 618. The next updates corresponding to Loop IDs 4-6 are lower or the same priority compared to the updates that were used to set the flushes for each tradeable object, thus, no changes are made to the scheduled flushes, and the processed update are simply coalesced with the previous updates.

An update corresponding to the Loop ID of 7 is a trade related update 620 for the second tradeable object. Because a trade related update is of a higher priority than a market depth update, the update 620 overwrites the initial flush, and the new flush is scheduled for the second tradeable object based on the update counter of 5 assigned to trade updates. Thus, as shown in FIG. 6 at 622, the flush for the second tradeable object is now modified to occur at the Loop ID of 12. As the Loop ID reaches "12," the updates corresponding to the second tradeable object are sent out from the gateway, as shown at 624. As explained in relation to FIG. 5, the data may be sent in a first packet including inside market data and trade information, and a second packet including market depth data received for the second tradeable object. Also, the packets that are sent from the gateway include the most up to date information, as the data from each update gets coalesced when each update is processed.

Also, the Loop ID of 12 corresponds to a trade update 626 and overwrites the queue flush that was scheduled for the first tradeable object. Based on the update 626, the queue flush for the first tradeable object is modified to now correspond to the Loop ID of 17, i.e., five updates following the trade update 626, as shown at 628. As the next update at the Loop ID of 13 is another trade update for the first tradeable object, i.e., the update has the same priority level as the one that was used to set the flush, the update is processed and the scheduled queue flush for the first tradeable object remains unchanged.

The next update 630 is an inside market related update corresponding to the second tradeable object. Since the update 630 is the first update after the last queue flush, the update 630 is used to schedule another queue flush, as shown at 632. Since the update 630 relates to the inside market, the queue flush is scheduled after 10 counts, at the Loop ID of 24. When an update at the Loop ID of 17 corresponding to the scheduled flush for the first tradeable object is reached, the data corresponding to the first tradeable object is sent from the gateway, as shown at 634. Then, when the next update 638 corresponding to the first tradeable object is received at the Loop ID of 19, a new flush is scheduled, as shown at 638. The next update at the Loop ID of 20 is a trade related update 640 corresponding to the second tradeable object. Since the flush for the second tradeable object was scheduled based on the inside market update 630, and the update 640 is a higher priority update, the flush for the second tradeable object is modified to now correspond to the Loop ID of 25, as shown at 642. As the gateway continues processing updates in the queue and reaches an update at the Loop ID of 24, data corresponding to the first tradeable object is sent from the gateway, as shown at 644. Then, the next Loop ID of 25 triggers transmission of data corresponding to the second tradeable object to be sent from the gateway, as shown at 646.

Figure 7:
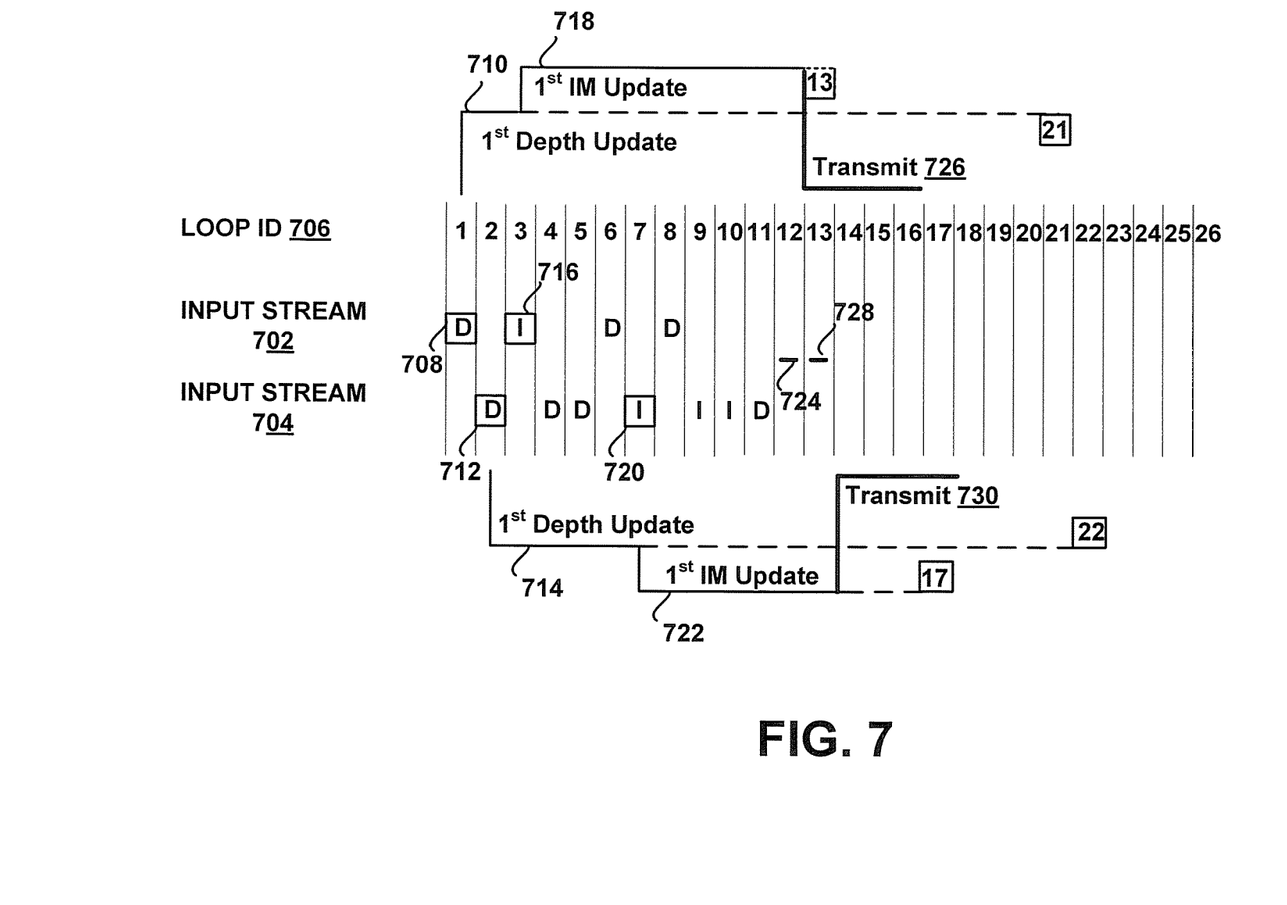
FIG. 7 is a block diagram illustrating an example operation of the system for controlled market data delivery when two input streams are received at a gateway and where the gateway runs out of updates to be processed in a queue.

FIG. 7 is a block diagram 700 illustrating one example operation of the system for a controlled market data delivery when two input streams are received at a gateway and where the gateway runs out of updates to be processed in a queue.

Similarly to FIG. 6, the block diagram 700 illustrates two input streams 702 and 704 corresponding to two tradeable objects. As each update is placed in a queue, a Loop ID is assigned to the updates, as shown at 706.

The first update in the queue with the Loop ID of 1 is a depth update 708 corresponding to the first input stream, and thus, a queue flush at the Loop ID of 21 is scheduled, as shown at 710. The second update with the Loop ID of 2 is a market depth update 712 that corresponds to the second input stream, and thus it triggers a flush at the Loop ID of 22, as shown at 714. As the gateway continues processing updates in the queue, the third update 716 is an inside market related update related to the first tradeable object, and because it is of a higher priority than the update 708 that was used to schedule the flush 710, the update 716 triggers the modification of the scheduled flush, as shown at 718. The next few updates corresponding to the Loop IDs 4-6 are lower or the same priority as the updates that were used to set the flushes, thus no changes are made to the scheduled flushes, and data in the updates is coalesced with data from previous updates.

An update corresponding to the Loop ID of 7 is an inside market related update 720 for the second tradeable object. Because an inside market related update is of a higher priority than a market depth update, the scheduled flush for the first tradeable object is modified and now is set to the Loop ID of 17, as shown at 722. The next few updates corresponding to the Loop IDs of 8-11 are of the lower or the same priority as the updates that were used to schedule the flushes, thus no changes are made. However, as the gateway processes the update at the Loop ID 11, and the Loop ID is updated to 12, it is determined that there is no additional update pending for processing in the queue, as shown in FIG. 7 at 724. Upon detecting no pending update for processing at the Loop ID 12, market update data corresponding to the first available scheduled flush, in this example, market data corresponding to the input stream 702 and the scheduled flush 718, is sent out from the gateway one Loop ID sooner than it was scheduled for, as shown at 726. Then, when the Loop ID is incremented to the Loop ID of 13, once again it is determined that there is no update pending in the queue for processing, as shown in FIG. 7 at 728. Upon detecting no update, data corresponding to the next available scheduled flush is sent out from the gateway. In this example, data corresponding to the second input stream 704 associated with the scheduled flush 722 is sent out from the gateway, as shown at 730. It should be understood that the process could be easily applied in relation to a larger number of input streams than the two illustrated in FIG. 7. As explained earlier, sending updates takes significantly longer as compared to processing each pending update. That means that performing a flush could give an input stream enough time to supply a new update. Rechecking the queue for a new update each time the Loop ID is incremented, this method ensures that the inbound data has priority over the empty queue flush mechanism. For example, if an update was detected at the Loop ID 13, the update would get processed as any other update in the input stream. Then, if no update was detected at the Loop ID 14, the empty queue flush mechanism would be activated again.

It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A non-transitory computer readable medium having stored therein instructions executable by a processor, including instructions executable to:
    receive by a network device a plurality of market updates from an electronic exchange;
    place by the network device the plurality of market updates in a queue;
    determine by the network device a first update type for a first market update of the plurality market updates in the queue based on at least one of a price update and a quantity update in the first market update;
    set by the network device a first number of market updates to be processed in the queue before any market information from the plurality of market updates is sent from the network device to a client device based on the determined first update type;
    set by the network device a data-flush counter value based on the first number of market updates to be processed to schedule a data flush and a loop counter;
    process by the network device market updates from the queue, wherein the processing includes:
        coalesce by the network device each of the market updates from the queue to generate a coalesced market update, wherein the coalescing includes overwriting at least a first value corresponding to a price or a quantity in an earlier market update with a second value corresponding to the price or the quantity in a subsequent market update; and
        increment by the network device the loop counter;
    detect by the network device that the data-flush counter value has been reached based on the loop counter; and
    send by the network device, in response to detecting that the data-flush counter value has been reached, the coalesced market update the client device.

2. The non-transitory computer readable medium of claim 1, wherein the first number of market updates is set after detecting that a market update threshold has been exceeded.

3. The non-transitory computer readable medium of claim 2, wherein the market update threshold includes a number of market updates pending in the queue.

4. The non-transitory computer readable medium of claim 2, wherein the market update threshold includes a rate at which market updates are received and placed in the queue.

5. The non-transitory computer readable medium of claim 1, wherein the first market update includes an inside market update.

6. The non-transitory computer readable medium of claim 1, wherein the first market update includes a depth update.

7. The non-transitory computer readable medium of claim 1, wherein the first market update includes a trade update.

8. The non-transitory computer readable medium of claim 1, wherein the plurality of market updates includes a plurality of quantities pending at an inside market price, wherein the coalescing includes overwriting at least a first quantity corresponding to the inside market price with a second quantity corresponding to the inside market price to generate the coalesced market update.

9. The non-transitory computer readable medium of claim 1, wherein the plurality of market updates includes a plurality of quantities at a price other than an inside market price, wherein the coalescing includes overwriting at least a first quantity at the price with a second quantity at the price to generate the coalesced market update.

10. The non-transitory computer readable medium of claim 1, wherein the plurality of market updates includes a plurality of inside market prices, wherein the coalescing includes overwriting a first inside market price with a second inside market price to generate the coalesced market update.

11. The non-transitory computer readable medium of claim 1, wherein the plurality of market updates includes trade price data, wherein the coalescing includes overwriting at least a first trade price with a second trade price to generate the coalesced market update.

12. The non-transitory computer readable medium of claim 1, further including:
    determine by the network device, while processing the market updates from the queue, a second update type for a second market update based on at least one of a price update and a quantity update in the second market update, wherein the second update type is different than the first update type; and
    change by the network device the data-flush counter value based on a second number of market updates to be processed and the loop counter, wherein the second number of market updates to be processed is based on the determined second update type.

13. The non-transitory computer readable medium of claim 12, wherein the second number of market updates to be processed is less than the first number of market updates to be processed.

14. The non-transitory computer readable medium of claim 12, wherein the second number of market updates to be processed is greater than the first number of market updates to be processed.

15. The non-transitory computer readable medium of claim 12, wherein the first update type is of a lower priority than the second update type, wherein the second number of market updates to be processed is less than the first number of market updates to be processed.

16. The non-transitory computer readable medium of claim 12, wherein the network device is a gateway.

* * * * *